Feb. 7, 1939.  A. E. PETERSON  2,146,701
LIGHT FOR AUTOMOBILE REAR STORAGE COMPARTMENTS
Filed Sept. 3, 1937  2 Sheets-Sheet 1
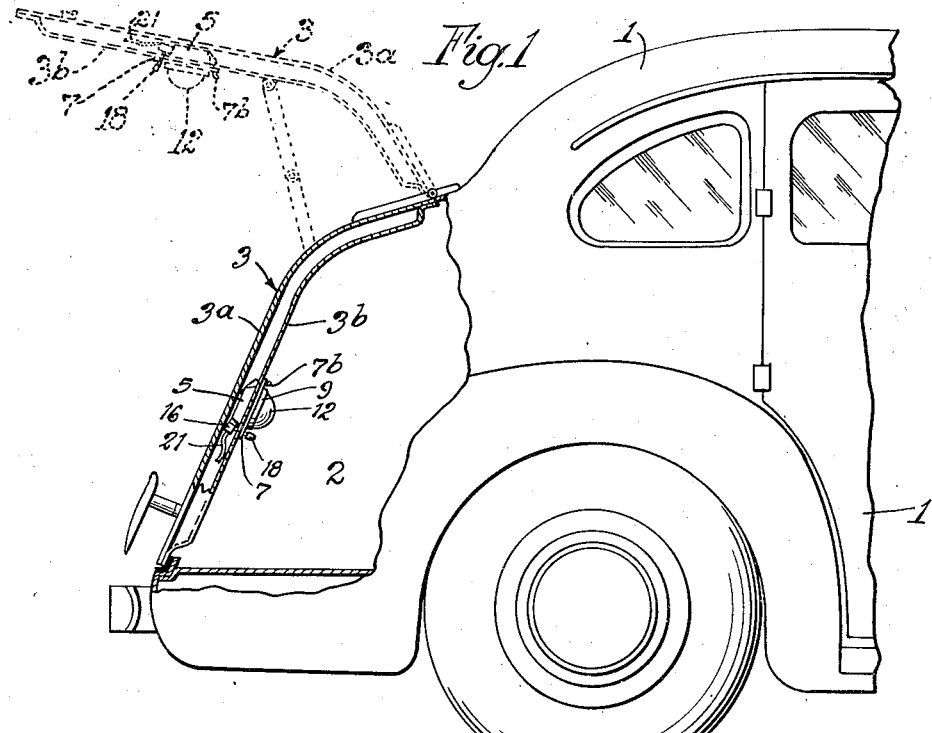
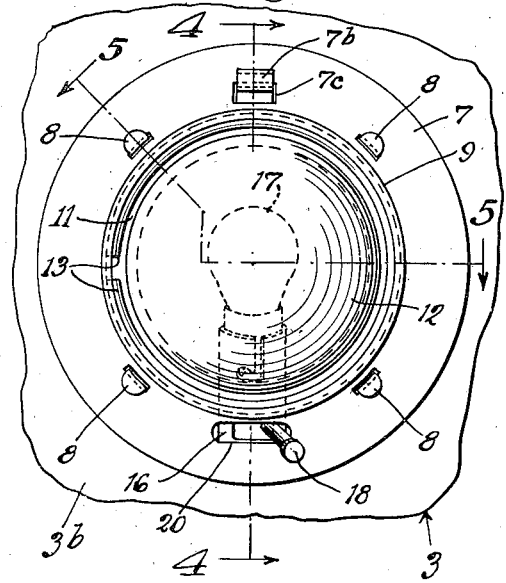
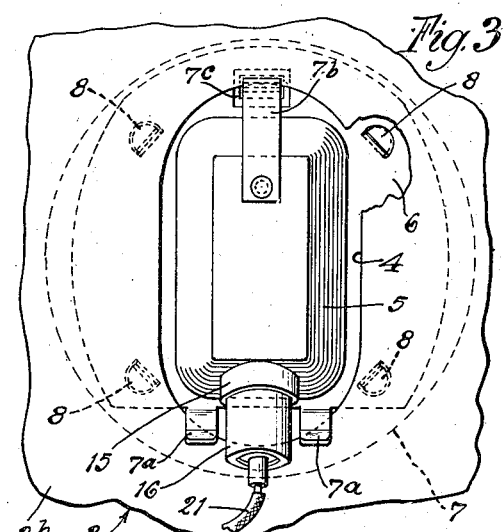
Inventor
Arthur E. Peterson Feb. 7, 1939.  A. E. PETERSON  2,146,701
LIGHT FOR AUTOMOBILE REAR STORAGE COMPARTMENTS
Filed Sept. 3, 1937  2 Sheets-Sheet 2
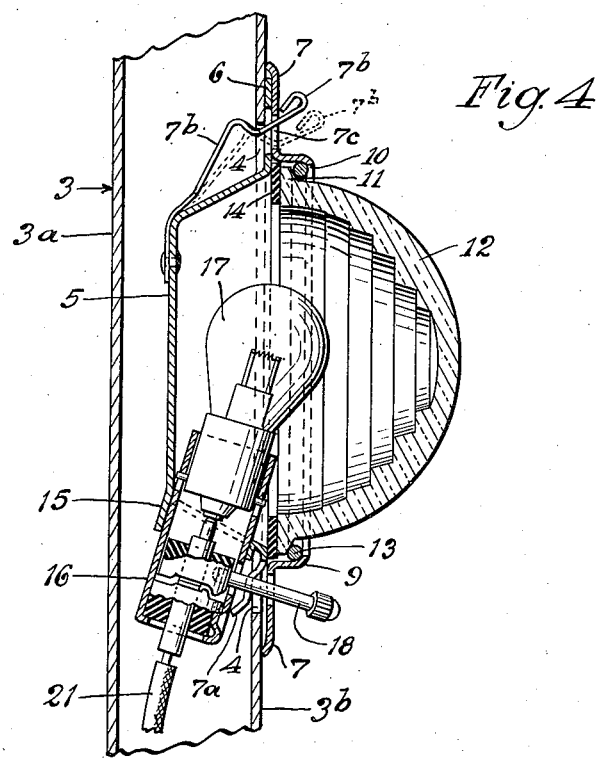
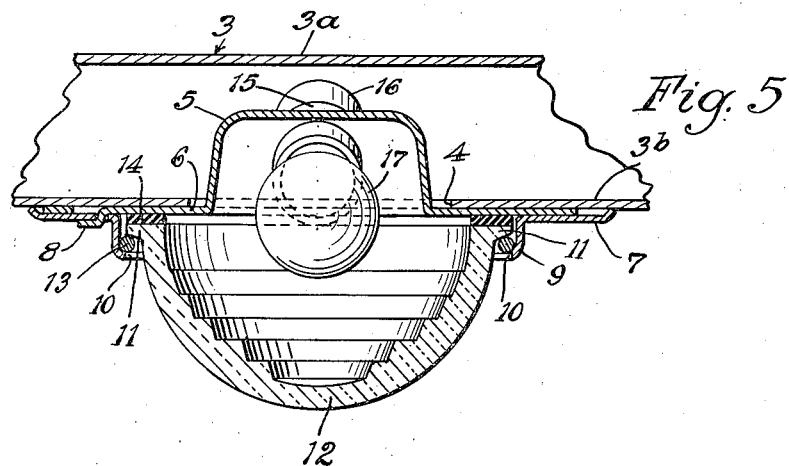
Inventor
Arthur E. Peterson
by Parker & Carter
Attorneys.

Patented Feb. 7, 1939

2,146,701

UNITED STATES PATENT OFFICE 2,146,701

LIGHT FOR AUTOMOBILE REAR STORAGE COMPARTMENTS

Arthur E. Peterson, Chicago, Ill., assignor to Chicago Forging & Manufacturing Company, Chicago, Ill., a corporation of Illinois Application September 3, 1937, Serial No. 162,320

1 Claim. (Cl. 240—7.1)

My invention relates to an improvement in automobile lighting means and has for one purpose the provision of a light for the rear luggage compartment of an automobile.

Another purpose is the provision of a light which may be efficiently installed on any supporting member or container having a hollow interior, such as the double walled closure of an automobile rear luggage compartment.

Other purposes will appear from time to time in the course of the specification and claim.

I illustrate my invention more or less diagrammatically in the accompanying drawings wherein:

Figure 1 illustrates the rear of an automobile with parts in vertical longitudinal section;

Figure 2 is a plan view of the light itself;

Figure 3 is a rear view of the light installed, with parts broken away;

Figure 4 is a section on the line 4—4 of Figure 2; and

Figure 5 is a section on the line 5—5 of Figure 2.

Like parts are indicated by like symbols throughout the specification and drawings.

Referring to the drawings, I generally indicates an automobile body having a rear luggage compartment generally indicated as 2 which in turn is closed by a door generally indicated as 3 having an outer wall 3a and a spaced inner wall 3b. The inner wall 3b is apertured as at 4 to permit the penetration therein of the inwardly extending housing portion 5.

Associated with the housing portion is a flange 6 adapted to abut against the outer face of the wall 3b. Secured to it is an outer flange or ring 7 which may be secured for example by ears 8 on the flange 6. The ring 7 is outwardly turned as at 9 and terminates in an edge 10 which defines an aperture of sufficient size to permit the entry of the bottom flange 11 of any suitable transparent lens or light distributing element 12. 13 is any suitable locking ring and 14 any suitable yielding washer whereby the parts may be kept in the position in which they are shown in Figure 5. The housing portion 5 is restricted at its lower end at 15 and secured in the portion 15 is any suitable bulb socket element generally indicated as 16, the details of which do not of themselves form part of the present invention. 17 is any suitable electric bulb.

18 indicates a switch lever or handle the details of which do not form part of the present invention but which serves for the manual control of the bulb or light 17. It will be observed that the switch lever 18 extends outwardly through the aperture 4 in the wall 3b and through an alined aperture 20 in the ring 7. Thus although the socket 16 and a substantial portion of the bulb 17 are in the space between the walls 3a and 3b, the switch 18 projects outwardly from said space for easy manual access.

21 indicates any suitable conductor or pair of conductors for electric power which may extend through the interior of the door through the walls 3a and 3b to any suitable connection with the electric power source of the vehicle, a battery, motor, generator or the like.

The electric light unit or housing is removably secured in an aperture 4 in the inner wall 3b. When the parts are in the position in which they are shown in Figure 4, the lower edge of the ring 7 abuts against the outer face of the wall 3b. The abutment or abutments 7a engage the inner face of the edge of the lower portion of said aperture 4. The upper portion of the rings 6 and 7 is held against the face of the wall 3b as by the yielding catch 7b, herein shown in the form of a spring the outer portion of which passes through the aperture 7c in the ring 7 and the flange 6. If the operator wishes to remove the entire assembly, he merely presses down on the spring 7b and outwardly withdraws the whole assembly which then rotates about an axis roughly defined by the members 7a.

It will be realized that whereas I have herein shown and described a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

In particular I have provided a very simple and efficient means for mounting a light in the rear luggage compartment of automobiles and for securing lights to compound wall or closure elements or the like. In the form of the drawings I provide a member in which a substantial portion of the mechanism is housed within the space between two spaced walls. This reduces the outward extension of the lighting mechanism.

My lamp is highly advantageous since it may quickly be snapped into place without drilling or tapping. The aperture 4 shown for example in Figure 3 is prevailingly found in automobiles of various makes, including for example Chrysler, and may have for purpose to permit access to interior bolts or fastenings for such members as license plate supports. The lamp of my present application is proportioned to snap into such an aperture. The lower flanges 7a engage the inner face of the wall 3b and the flange 7 engages its outer face as shown for example in Figure 4. The spring 7b serves as a strong spring catch. The operator can snap the device into place in an instant and the spring 7b holds it firmly in place. It may of course be removed with equal ease by simply pulling the member 7b from the full line or locking position of Figure 4 to the dotted or releasing position.

One advantage of the device above described is that by permitting the bulb to penetrate the space between the walls 3 and 3b of an automobile door I am able to employ a bigger bulb than could otherwise be used and obtain greater and more adequate illumination. If the bulb and its socket had to be positioned entirely within the member 12 it would increase the clearance necessary and require a larger lens or transparent housing than is practically permissible. Hence there is a very substantial advantage in positioning the bulb or preferably the bulb and its socket largely within the space between the walls 3 and 3b.

I claim:

As a new article of manufacture, a lamp and lamp housing unit adapted for ready unitary insertion into and removal from an automobile door having a plurality of spaced wall elements, said housing including an abutment plate adapted to be opposed to one face of said wall elements, and a housing portion associated with said plate and adapted to penetrate an aperture in said wall element, a fixed abutment adapted to engage the opposite face of said wall element, and a movable locking abutment associated with said housing member and adapted to engage the opposite face of said wall at another point, said abutment including a handle portion extending to the opposite side of said plate from the housing member, a flange associated with said plate and generally alined with said housing portion, a concavo-convex lens, and means for mounting it in said flange, a socket unitarily associated with said housing member, a lamp bulb associated with said socket and located in part within said housing member and in part within said lens, and conductive connections for said lamp adapted to be positioned between the wall members of the automobile door.

ARTHUR E. PETERSON.